United States Patent
Bajikar et al.

(10) Patent No.: US 8,611,035 B1
(45) Date of Patent: Dec. 17, 2013

(54) CAPACITANCE SENSOR FOR DETERMINING A DISTANCE BETWEEN A HEAD AND A MAGNETIC STORAGE MEDIUM

(75) Inventors: Sateeshchandra S. Bajikar, San Jose, CA (US); Minh Q. Tran, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 52 days.

(21) Appl. No.: 13/367,334

(22) Filed: Feb. 6, 2012

(51) Int. Cl.
*G11B 5/56* (2006.01)

(52) U.S. Cl.
USPC .......................................................... 360/75

(58) Field of Classification Search
USPC .................................... 360/75, 31, 77.03, 48
See application file for complete search history.

(56) References Cited

U.S. PATENT DOCUMENTS

| | | | |
|---|---|---|---|
| 4,931,887 A | 6/1990 | Hegde et al. | |
| 5,070,302 A | 12/1991 | Marcus et al. | |
| 5,168,483 A | 12/1992 | Oka et al. | |
| 6,046,596 A | 4/2000 | Schaenzer et al. | |
| 6,501,606 B2 * | 12/2002 | Boutaghou et al. | 360/25 |
| 6,661,607 B2 * | 12/2003 | Stein | 360/128 |
| 6,967,805 B1 | 11/2005 | Hanchi et al. | |
| 7,012,777 B1 | 3/2006 | Hirano et al. | |
| 7,068,449 B2 | 6/2006 | Riddering et al. | |
| 7,394,611 B1 | 7/2008 | Rahgozar | |
| 7,450,333 B2 * | 11/2008 | Hirano et al. | 360/75 |
| 7,450,335 B2 * | 11/2008 | Hirano et al. | 360/77.03 |
| 7,692,897 B2 | 4/2010 | Edelman et al. | |
| 7,729,079 B1 * | 6/2010 | Huber | 360/75 |
| 7,830,634 B2 * | 11/2010 | Chen et al. | 360/75 |
| 7,952,829 B2 | 5/2011 | Ionescu | |

* cited by examiner

*Primary Examiner* — Nabil Hindi (57) ABSTRACT

A proximity sensor is described including a capacitor formed by a first conductive element and a second conductive element. The first conductive element and the second conductive element are situated at a magnetic head, a slider that connects to the magnetic head, a reader of the magnetic head, a writer of the magnetic head, a reader shield of the magnetic head, or a writer shield of the magnetic head. A capacitance and a fringing electric field are formed by the capacitor when there is a voltage difference between the first conductive element and the second conductive element. The capacitor is situated such that the fringing electric field changes with a positioning change of a magnetic storage medium with respect to at least one of the first conductive element and the second conductive element. The capacitor is also situated such that the capacitance changes with the fringing electric field change.

23 Claims, 6 Drawing Sheets

CAPACITANCE SENSOR FOR DETERMINING A DISTANCE BETWEEN A HEAD AND A MAGNETIC STORAGE MEDIUM

FIELD

The invention relates generally to the field of magnetic recording systems. More specifically, embodiments of the present invention pertain to determining a distance between a read/write head and a magnetic storage medium.

BACKGROUND

Magnetic storage systems, such as a hard disk drive (HDD), are utilized in a wide variety of devices in both stationary and mobile computing environments. Examples of devices that incorporate magnetic storage systems include desktop computers, portable notebook computers, digital versatile disc (DVD) players, high definition television (HDTV) receivers, vehicle control systems, cellular or mobile telephones, television set top boxes, digital cameras, digital video cameras, video game consoles, and portable media players.

A typical HDD includes magnetic storage media of one or more flat disks. The disks are generally formed of two main substances, namely, a substrate material that gives it structure and rigidity, and a magnetic media coating that holds the magnetic impulses or moments that represent data. A typical HDD further includes a read/write head, generally a magnetic transducer which can sense and/or change the magnetic fields stored on the platters. The read/write head is attached to a slider, generally an armature capable of placing the read/write head at a desired location over the platter. In operation, a lift force is generated by the aerodynamic interaction between the magnetic head and the spinning magnetic disk. The lift force is opposed by equal and opposite spring forces applied by a suspension, such that, optimally, a predetermined flying height is maintained over a full radial stroke of the rotary actuator assembly above the surface of the spinning magnetic disk.

The height of the read/write head over the disk is referred to as the "fly height." The fly height of a HDD is a critical distance. If the fly height is too high, the magnetic fields will be too weak or dispersed for the read/write head to function. If the fly height is too low, there is an increased danger of a "head crash," wherein the read/write head touches the surface of the magnetic storage medium, thereby destroying data and/or damaging the read/write head or the magnetic storage medium. Moreover, as the density of data on the magnetic storage medium increases, the strength of the magnetic fields generally decrease, in order to minimize interference. Higher areal density in magnetic storage medium generally requires both advanced read/write transducer design and very fine control of the fly height of the read/write head. Additionally, magnetic storage media are frequently subjected to various magnitudes of mechanical shock as a result of handling. As such, performance and design needs have intensified. Additionally, small drives have very narrow tolerances. Disk drive heads and sliders are designed to fly in very close proximity to the disk surface. In some systems the head may be designed to fly three to five nanometers above the disk surface.

Accurate measurements of the spacing between the read and/or write head and the disk surface is a necessity in any HDD design to verify the head-to-disk interface functionality for mechanical, tribological and electrical performances. Further, detection of contacts of a head and a disk is useful for a number of diagnostic tests, enabling assessments such as component-level fly ability and durability, drive-level reliability, and production-level screening to be made, as well as for providing input to fly-height calibration and adaptive fly-control systems that enable dynamic adjustment of flying height in disk drive systems.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

Contemporary contact detectors measure small capacitances and capacitance changes using electrical contact through the disk drive spindle to the disk. This contemporary method presents problems and limitations in part due to variations in impedance over time of the spindle contact with usage and wear. Moreover, electrical connectors to the head may undergo changes in capacitance as caused by environmental variations, thereby affecting head behavior.

An apparatus, system and method are described herein for determining a distance between surfaces of a head and/or slider with respect to a magnetic storage medium. The distances that may be determined by embodiments of the invention include head fly-height of the head and/or slider, head-to-disk proximity, and head-to-disk contact (touchdown). In an embodiment, the sensor may also be utilized to determine proximity of read/write shields to disk, proximity of read/write shields to disk when actuated, and to detect shock events occurring between a magnetic head and a disk.

Changes in a fringing electric field have an effect on sensor elements integrated on a head and/or slider, the fringing electric field changes caused by proximity changes between a magnetic recording media and the sensor elements located at the head and/or slider. Embodiments of the invention include a single ended proximity sensor, and a differential proximity sensor with sensor environmental compensation. In an embodiment, the proximity sensor facilitates closed-loop dynamic flying height (DFH) control with fly height actuation, fly-height measurement and feedback, to maintain optimal proximity of head/slider to disk.

In an embodiment, the proximity sensor allows the head to operate with greater proximity to disk, and corrects for head variations due to manufacturing differences. Improved head performance means higher data storage densities and drive capabilities. By detecting shock events, the proximity sensor may eliminate the necessity of accelerometers in shock-sensitive products, saving costs.

It will be apparent that the sensors and methods disclosed within this discussion and claims may be utilized with disk drive memory systems, and other memory systems utilizing a reading and/or writing device positioned in close proximity to a storage medium.

Figure 1:
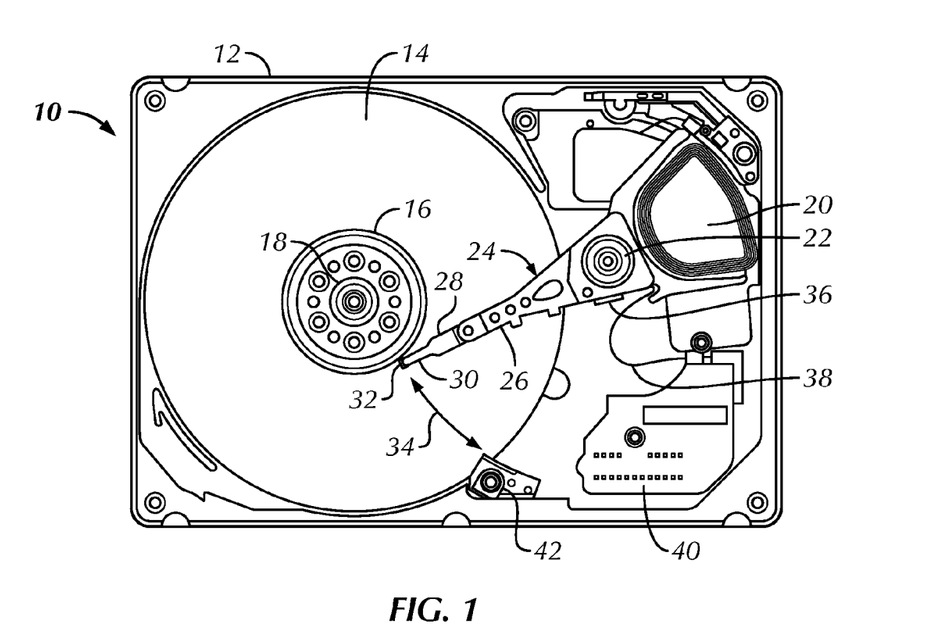
FIG. 1 is a top plan view of a disk drive data storage system in which the present invention is useful.

Referring to the drawings wherein identical reference numerals denote the same elements throughout the various views, FIG. 1 illustrates a disk drive storage system 10, in which embodiments of the present invention are useful. Features of the discussion and claims are not limited to this particular design, which is shown only for purposes of the example. Disk drive 10 includes base plate 12 that may be disposed on a top cover (not shown) forming a sealed environment to protect internal components from contamination by elements outside the sealed environment.

Disk drive 10 further includes one or more data storage disks 14 of computer-readable data storage media. Typically, both of the major surfaces of each data storage disk 14 include a plurality of concentrically disposed tracks for data storage purposes. Each data storage disk 14 is mounted on a hub or spindle 16, which in turn is rotatably interconnected with the base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor 20 is a magnetic assembly that controls the operation of the actuator arm assembly 24 under the direction of control electronics 40.

Figure 2A:
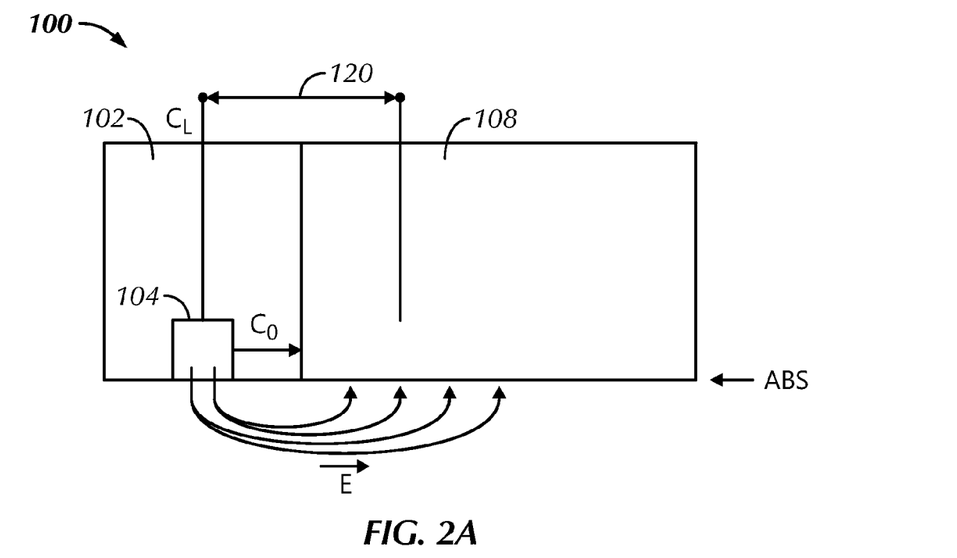
FIG. 2A is a sectional side view of a slider and a magnetic head as used in a disk drive data storage system as in FIG. 1, in an embodiment of the present invention.

A suspension 28 is attached to the free end of each actuator arm 26 and cantilevers therefrom. Typically, the suspension 28 is biased generally toward its corresponding data storage disk 14 by a spring-like force. A slider 30 is disposed at or near the free end of each suspension 28. What is commonly referred to as the read/write head (e.g., transducer) is appropriately mounted as a head unit 32 under the slider 30 and is used in disk drive read/write operations. Head unit 32 is shown in FIG. 2A. The head unit 32 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations. In this regard, the voice coil motor 20 is utilized to pivot the actuator arm assembly 24 to simultaneously move the slider 30 along arc path 34 and across the corresponding data storage disk 14 to position the head unit 32 at the selected position on the data storage disk 14 for disk drive read/write operations by the head unit 32.

When the disk drive 10 is not in operation, the actuator arm assembly 24 is pivoted to a "parked position" to dispose each slider 30 generally at or beyond a perimeter of its corresponding data storage disk 14, but in any case in vertically spaced relation to its corresponding data storage disk 14. In this regard, the disk drive 10 includes a ramp assembly 42 that is disposed beyond a perimeter of the data storage disk 14 to typically both move the corresponding slider 30 vertically away from its corresponding data storage disk 14 and to also exert somewhat of a retaining force on the actuator arm assembly 24.

FIG. 2A depicts components of a proximity sensor 100 for determining a distance of a magnetic head with respect to a surface of a magnetic storage medium, in an embodiment of the present invention. Proximity sensor 100 includes a head 102 and a slider 108, which may be utilized with a magnetic recording system as in the disk drive of FIG. 1. The proximity sensor 100, including head 102 and slider 108, may be fabricated separately from other components of the magnetic recording system, for eventual connection of slider 108 to an actuator. Other structures may be situated on slider 108 such as read transducer shields, write transducer shields, or dielectric layers. For example, a diamond-like carbon (DLC) layer may be provided on the air-bearing surface (ABS) of the slider 108. Alternatively, the DLC layer may be provided on a facing surface of a disk.

In the embodiment show, head 102 includes capacitor element 104, which forms a capacitor with slider 108 (or a portion of slider 108), slider 108 acting as a second capacitor element. Alternatively, a conductor may be attached to slider 108 to form a capacitor with capacitor element 104. Various conductors or structures may be utilized for capacitor element 104, including a capacitor plate, a metallization or a lead. Existing head features such as a reader shield or writer shield may be utilized for capacitor element 104.

Modification of the electrical connections of the reader or writer shield may be made so that the capacitor element 104 is electrically isolated from the shield and connected to a contact pad on head 102. Further, the reader or writer shield, along with additional conductive layers on the head 102 or ABS may be used as the capacitor element 104, to adjust the sensitivity of the capacitor element, without modifying the magnetic characteristics of the head 102. Alternatively, capacitor element 104 may be incorporated or added to a head. As an example, at least a portion of a reader shield or a writer shield of the head, or other dedicated structure, is utilized as capacitor element 104. Further, as described below, capacitor element 104 may be situated with a structure other than head 102.

In an embodiment, the size dimensions of capacitor element 104 are smaller in directions parallel to the disk surface as compared to the second conductive element (e.g., slider 108), thereby increasing the proximity sensor sensitivity to the distance between capacitor element 104 and the disk. As an example, capacitor element 104 is tens of microns in size in directions parallel to the disk surface, and the second conductive element is hundreds of microns in size in directions parallel to the disk surface. Capacitor element 104 may also be situated a closer distance from a touchdown location of the head 102 than the second conductive element.

The capacitor elements 104 and 108 are electrically connected in series, and the smaller capacitance element has a larger impedance. The smaller capacitance element 104 has a higher sensitivity than the larger capacitance element 108. In an embodiment, the proximity sensor utilizes the more sensitive element 104 in determining any change in capacitance.

In an embodiment, capacitor element 104 has a width in the range of 5 to 100 microns, and a length in the range of 3 to 10 microns. In an embodiment, capacitor element 104 is situated below a surface of the head 102 a distance in the range of 1 to 50 microns when capacitor element 104 is fabricated along with wafer fabrication of the head, or in the range of 1 to 100 microns when capacitor element 104 is fabricated along with fabrication of an air bearing surface. It may be desirable to minimize the distance that capacitor element 104 is situated below the surface of head 102, as determined by the choice of fabrication process materials and head magnetic design. In an embodiment, the proximity sensor may be implemented without substantial addition to a conventional slider or disk drive system. Appropriate electrical connections from the head to contact pads may be utilized.

The electrically isolated capacitor elements 104 and 108 are situated for being positioned adjacent to a facing surface of a magnetic storage medium. Capacitor elements 104 and 108 may be situated adjacent to the ABS. Capacitor elements 104 and 108 are situated to form a fringing electric field (shown as $\vec{E}$) beside and by the formed capacitor, when there is the voltage difference between the first conductive element and the second conductive element. Parasitic capacitance $C_0$ exists between the capacitor element 104 and ground, and parasitic capacitance $C_L$ exists due to electrical connections to/from the head 102.

As described below with reference to FIG. 2B, the fringing electrical field ($\vec{E}$) changes with a positioning change of a magnetic storage medium with respect to either, or both, the first conductive element and the second conductive element. A capacitance of the capacitor changes with the fringing electric field change. Capacitance 120 detected between capacitor element 104 and slider 108 is utilized to determine a distance of head 102 with respect to a surface of a magnetic storage medium.

Figure 2B:
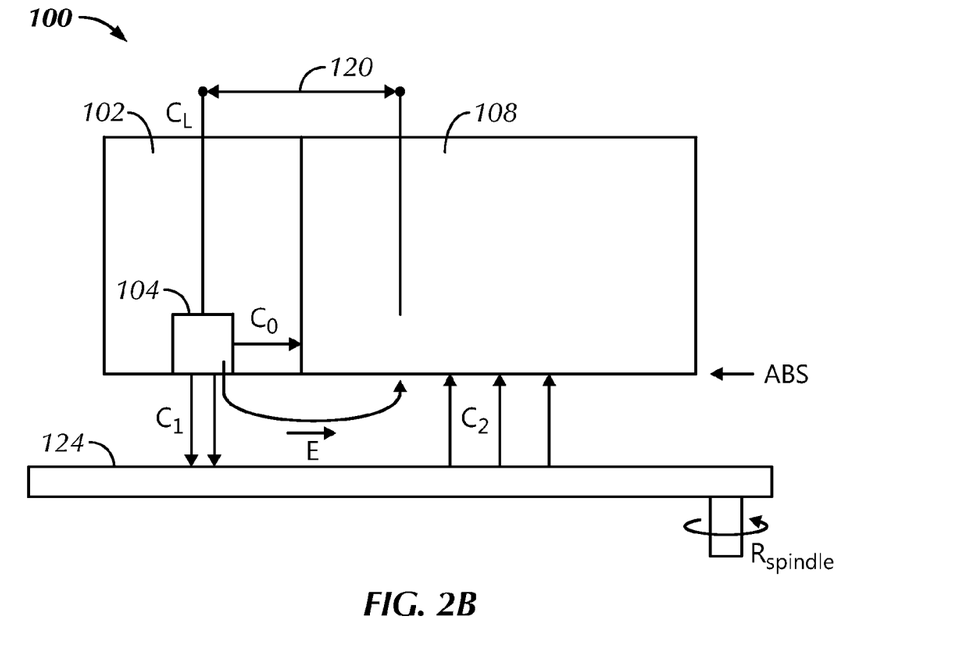
FIG. 2B is a sectional side view of the slider and magnetic head as in FIG. 2A, further including a data storage disk as used in a disk drive data storage system as in FIG. 1, in an embodiment of the present invention.

FIG. 2B illustrates the proximity sensor 100 of FIG. 2A, further including a data storage disk 124, in a further embodiment of the present invention. A change in proximity of the data storage disk 124 with respect to capacitor element 104 and/or slider 108 changes the fringing electric field. The fringing electric field $\vec{E}$ is reduced as data storage disk 124 is positioned closer to capacitor elements 104 and 108. The fringing electric field, or a portion thereof, may be shorted to the data storage disk 124, as illustrated by capacitance $C_1$ and $C_2$. In an embodiment, the capacitor element 108 dimensions, as compared to capacitor element 104 dimensions, are such that the capacitance $C_2$ is larger than $C_1$.

The proximity sensor may additionally include leads connected to capacitor elements 104 and 108. When a voltage difference exists between capacitor elements 104 and 108, then a fringing electric field forms beside and by the capacitor. In a further embodiment, the proximity sensor includes a source connected to the leads to create the voltage difference between capacitor elements 104 and 108. As an example, the voltage difference may be created by a voltage source, sensing circuitry, or other structure, and coupled by the leads to capacitor elements 104 and 108. The sensing circuitry or other structure detects and utilizes the capacitance information to determine a distance of the data storage disk 124 with respect to at least one of capacitor elements 104 and 108. The capacitance information 120 may be utilized to maintain a constant proximity of the head 102 and/or slider 108 with respect to the data storage disk 124, detect contact or touchdown of the head 102 with the data storage disk 124, and/or detect a shock event of the head 102 and the data storage disk 124.

Contemporary off-the-shelf capacitance to digital converting integrated circuits may measure values of $C_1$, $C_2$, $C_0$ and $C_L$, and capacitance 120. In an example, values of $C_1$ are about 200 fF, and values of $C_2$ are about 2 pF. The sum of $C_0$ and $C_L$ has been experimentally measured at 18 pF. The sensitivity of an embodiment of the proximity sensor has been measured on the order of 10 to 50 fF/nm change in fly-height, as dependent on the dimensions of capacitor element 104.

Figure 3:
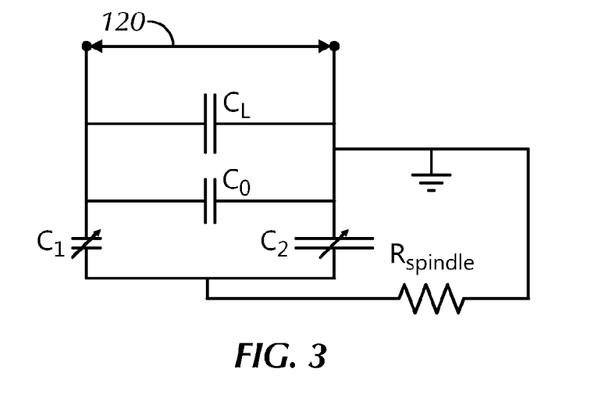
FIG. 3 is a schematic representation of the capacitance circuit formed by the slider, magnetic head and data storage disk of FIG. 2B.

Referring now to FIG. 3, a schematic representation is illustrated of the capacitance circuit formed by the slider, magnetic head and data storage disk of FIG. 2B. A small fly-height causes a capacitance $C_1$ between capacitor element 104 and data storage disk 124. In this example, a larger capacitance $C_2$ occurs between slider 108 and data storage disk 124, slider 108 having a larger capacitor element and/or situated a longer distance from a touchdown location, as compared to capacitor element 104. $C_1$ and $C_2$ are inversely proportional to the fly-height of the head 102 with respect to the data storage disk 124. Parasitic capacitance $C_0$ exists between the capacitor element 104 and ground, and larger parasitic capacitance $C_L$ exists due to electrical connections to and from the head 102. A conducting path from data storage disk 124 to ground is present through the spindle. In this example, parasitic capacitance $C_0$ is constant (but may be environmentally dependent), and $C_1$ and $C_2$ are dependent on the distance between the head 102 and the data storage disk 124 or fly-height.

The impedance of the conducting path from data storage disk 124 to ground is larger than the capacitive impedance of $C_2$. The measured capacitance of $C_1$ and $C_2$ are therefore dominant, and are connected in series through the data storage disk 124. In this example, capacitance $C_2$ is larger than $C_1$, so the combined capacitance of $C_1$ and $C_2$ is dominated by $C_1$. Changes in the capacitance of this leg of the circuit are dominated by changes in $C_1$. The variation of the capacitance measured at capacitance 120 therefore measures the variation of the capacitance $C_1$, which is inversely proportional to fly-height, proximity and contact touch-down conditions. Capacitance 120 between capacitor element 104 and slider 108 is thus utilized to determine a distance of head 102 with respect to a surface of a magnetic storage medium.

Figure 4:
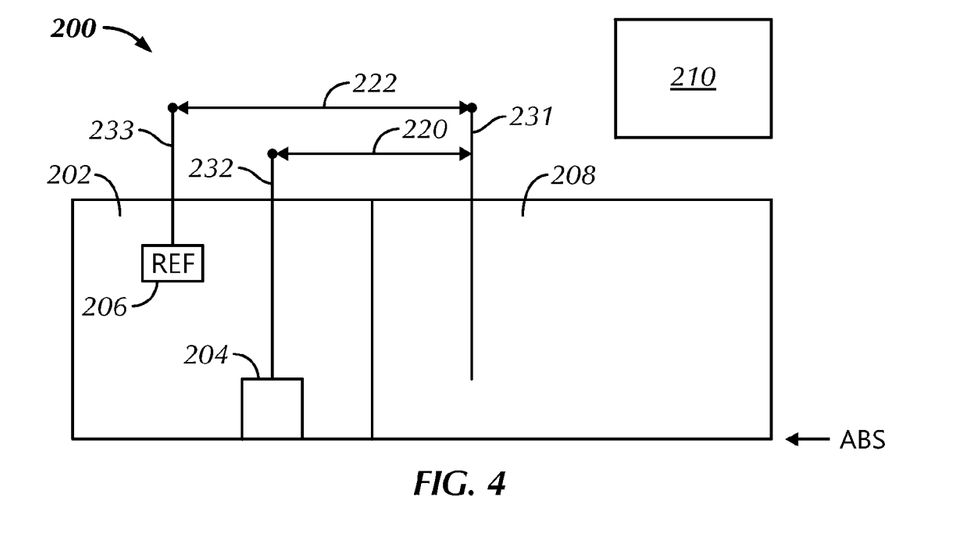
FIG. 4 is a sectional side view of a magnetic head and a slider as used in a disk drive data storage system as in FIG. 1, further including a reference capacitor, in another embodiment of the present invention.

Turning now to FIG. 4, a differential proximity sensor 200 is shown including a magnetic head 202, a slider 208, and a reference capacitor 206, as may be used in a disk drive data storage system as in FIG. 1, in another embodiment of the present invention. The parasitic capacitances $C_0$ and $C_L$ (illustrated in FIG. 2A) may be environmentally dependent. In an example, flex connectors used to connect a head may absorb moisture thereby altering the dielectric constant, and thus the capacitance of the material, resulting in errors in measuring or determining fly-height. In order to eliminate or at least minimize the effect of such environmental variations on the sensor response, a reference capacitor is employed at the magnetic head 202. The two elements of the reference capacitor include capacitor element 206 and capacitor element 208 (e.g., slider 208). Unlike capacitor element 204, reference capacitor element 206 is situated such that a positioning change of a data storage disk with respect to the reference capacitor element 206 has a minimized or no effect on a capacitance between the reference capacitor element 206 and the capacitor element 208.

Capacitance 220 between capacitor element 204 and slider 208 is utilized to determine a distance of head 202 with respect to a surface of a magnetic storage medium. Reference capacitance 222 provides a baseline capacitance value which may be used in determining any variations to capacitance 220 caused by environmental effects to the capacitor elements or head. If a capacitance variation is observed, compensation to distance determination may be employed to offset the head-to-disk distance variation.

Capacitor element 208 (e.g., slider 208) is common to both capacitor element 204 and reference capacitor element 206. A voltage source or sensing circuitry may be employed to create a voltage difference at a desired time between capacitor elements 204 and 208, and between reference capacitor element 206 and element 208. As an alternative to using slider 208 as the capacitor element, a capacitor plate or other conductor may be employed at slider 208. In an embodiment, the physical dimensions of reference capacitor element 206 are chosen to closely match the capacitance value of capacitor element 204. Any electrical leads extending from the capacitor elements at the head are similarly structured so that reference capacitor element 206 and capacitor element 204 are subject to alike environmental parasitic capacitance variation. A differential measurement is employed such that any measured difference in capacitance between capacitor elements 204/208 and the reference capacitor elements 206/208 is utilized (e.g., by a DFH controller) to eliminate or reduce environmental effects on the proximity sensor.

In the illustrated embodiment, the proximity sensor 200 includes a source connected to leads 231, 232 and 233, to create the voltage difference between capacitor elements 204 and 208, and between capacitor elements 206 and 208. As an example, the voltage difference may be created by a sensing circuitry 210, voltage source, or other structure, and coupled by the leads 231, 232 and 233 to capacitor elements 204, 206 and 208. The sensing circuitry 210 or other structure detects and utilizes the capacitance information to determine a distance of a data storage disk with respect to at least one of capacitor elements 204 and 208. A DFH controller may be employed to detect the capacitances 220 and 222, determine a distance of a data storage disk with respect to capacitor elements 204 and/or capacitor element 208, and utilize the capacitance information 220 and 222 to maintain a constant proximity of the head 202 and/or slider 208 with respect to the data storage disk, detect contact or touchdown of the head 202 with the data storage disk, and/or detect a shock event of the head 202 and the data storage disk.

Figure 5:
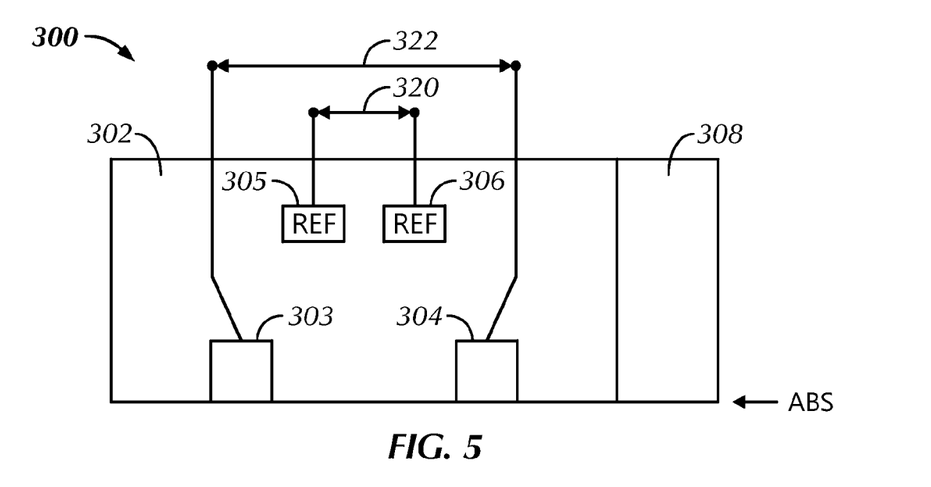
FIG. 5 is a sectional side view of a magnetic head and a slider as used in a disk drive data storage system as in FIG. 1, further including a reference capacitor, in a further embodiment of the present invention.

FIG. 5 illustrates another differential proximity sensor 300 including a magnetic head 302, a slider 308, and a reference capacitor, as may be used in a disk drive data storage system as in FIG. 1. Here, the capacitor elements 303 and 304 are situated at the head and floating, such that neither capacitor element utilizes the grounded slider 308 as its opposite capacitor element. An improved signal-to-noise ratio may be observed when the conductive capacitor elements 303 and 304 are floating rather than grounded.

Capacitor elements 303 and 304 may be stacked in the head 302, or spaced in a lateral configuration. As described above, capacitance 322 changes with the fringing electric field change. Reference capacitor elements 305 and 306 are also floating and form a reference capacitor to eliminate or at least minimize the effect of environmental variations on the proximity sensor. Elements 305 and 306 may also be stacked in the head 302, or spaced in a lateral configuration in the head 302. Unlike capacitor elements 303 and 304, reference capacitor elements 305 and 306 are situated such that a positioning change of a data storage disk with respect to the reference capacitor elements 305 and 306 have a minimized or no effect on a capacitance 320 between the reference capacitor elements 305 and 306.

Figure 6:
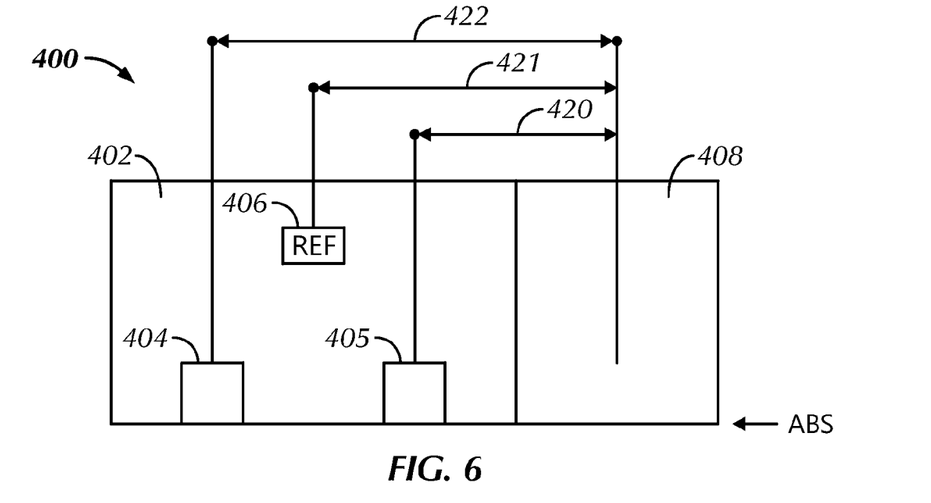
FIG. 6 is a sectional side view of a magnetic head and a slider as used in a disk drive data storage system as in FIG. 1, further including a reference capacitor, in yet a further embodiment of the present invention.

In an alternative embodiment of the invention, as shown in FIG. 6, the proximity sensor 400 utilizes one reference capacitor element 406 situated at the head 402, and a second reference capacitor element situated at the slider 408 or being slider 408. The slider 408, or a conductive element situated at slider 408, is common to capacitor elements 404 and 405. A voltage source or sensing circuitry may be employed to create a voltage difference at a desired time between capacitor element 404 and slider 408, between capacitor element 405 and slider 408, and between reference capacitor element 406 and slider 408. Reference capacitance 421 provides a baseline capacitance value which may be used in determining any variations to capacitances 420 and 422 caused by environmental effects to capacitor elements 404, 405 or head 402.

In this embodiment of the proximity sensor, capacitor element 404 is situated at the reader, and capacitor element 405 is situated at the writer. In head designs with dual heaters, distance or touchdown is detected with the actuated heater, and differences in distances of reader-to-disk and writer-to-disk may exist. In an alternative design, capacitor element 404 is situated at the reader, and the opposing capacitor element 405 is situated on the head (not on the writer). In a further alternative design, capacitor element 405 is situated on the writer, and the opposing capacitor element 404 is situated on the head (not on the reader).

Figure 7:
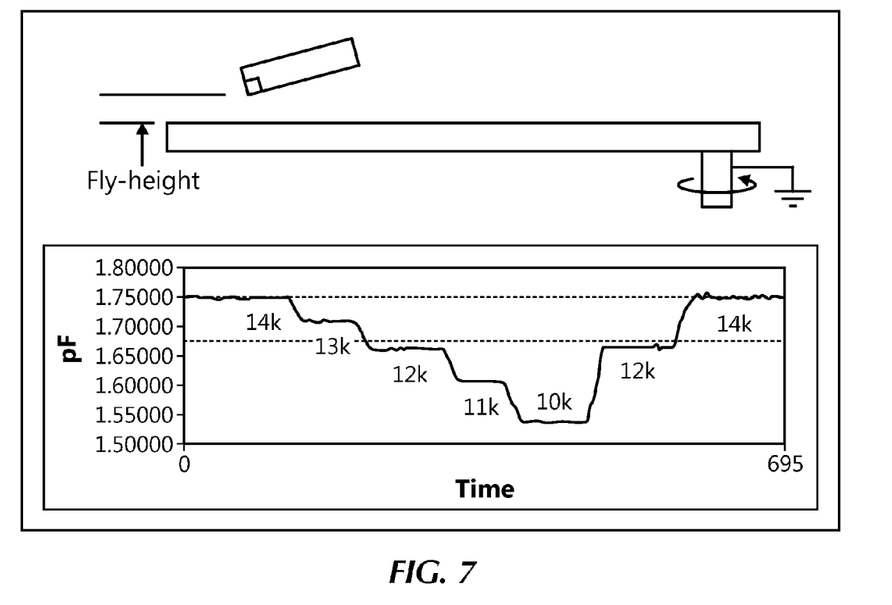
FIG. 7 is a representative graph illustrating experimental data of fly height as shown by sensor output of capacitance measurements with specified rotations per minute (rpm) of a data disk through time, in accordance with an embodiment of the present invention.

FIG. 7 illustrates experimental data of capacitance measurements from output from a proximity sensor, in an embodiment of the present invention. The capacitance measurements are shown at specified rotations per minute (rpm) through time. The capacitance measurements are utilized to determine fly-height of the head with respect to the data disk. Changes in head fly-height are induced by changes in disk speed and pressure. In the example show, each 1,000 rpm step corresponds to a 1 nm change in fly-height. The data was obtained with a sensitivity of about 50 fF/nm, a noise level of about 0.001 fF rms, and a measurement rate of 5 Hz.

Figure 8:
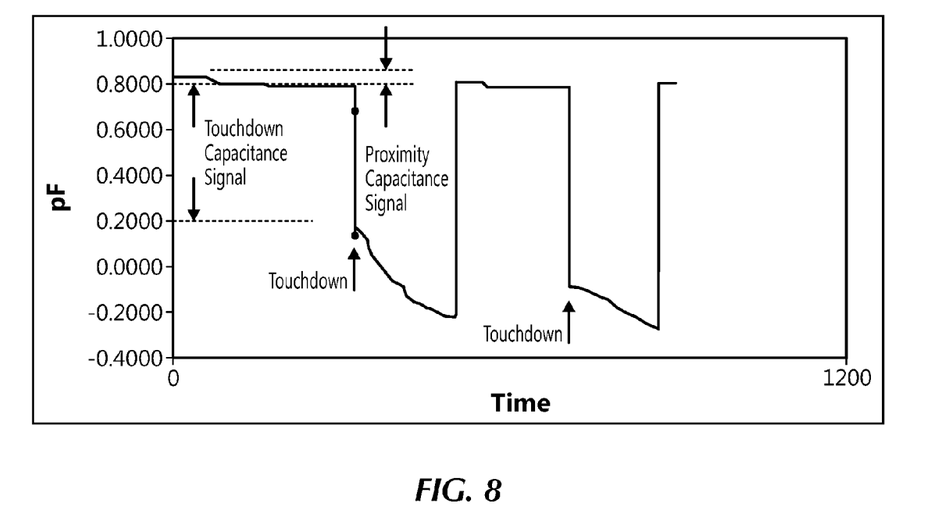
FIG. 8 is a representative graph illustrating experimental data of capacitance changes representing proximity changes of a head with respect to a disk, and head touchdown, in accordance with an embodiment of the present invention.

As illustrated in FIG. 8, the proximity sensor may also be utilized to detect touchdown. Given the reciprocal dependence of the measured capacitance to the proximity of the head to data storage disk, a sharp increase or spike in capacitance is observed over time when this is reduced to zero (touchdown) by actuating the DFH. This spike in capacitance is used to identify touchdown of a head on a data storage disk.

The proximity sensor may be further utilized to detect a shock event in a normal direction to the flying head. Large changes in measured capacitance are observed by the proximity sensor on a small time scale when the head is displaced significantly from its normal flying state due to a shock event.

Figure 9:
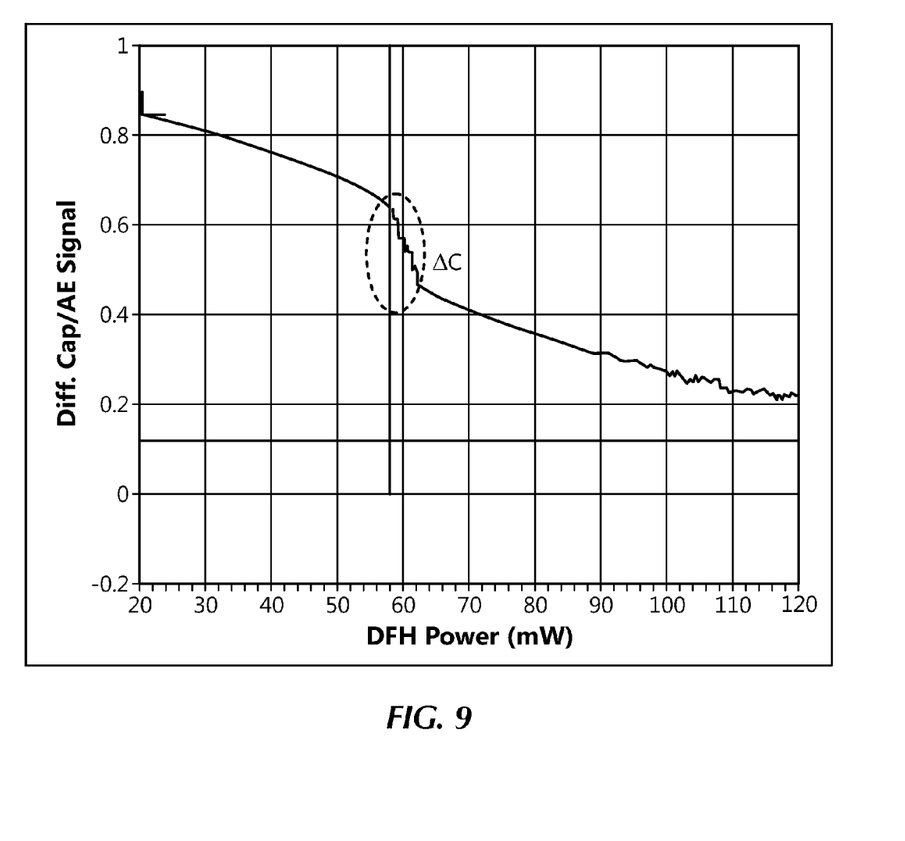
FIG. 9 is a representative graph illustrating experimental data of capacitance signal jump and capacitance oscillations that may occur near head touchdown, in accordance with an embodiment of the present invention.

FIG. 9 is a representative graph illustrating experimental data of capacitance signal jump and capacitance oscillations that may occur near head touchdown, in an embodiment of the present invention. Touchdown may be detected as a jump in differential capacitance at low frequency or oscillations at high frequency. The signal jump and oscillations may be utilized by a (DFH) controller to maintain a predetermined proximity of the head and/or slider with respect to the data storage disk, to detect touchdown, and/or detect a shock event.

In an example experiment, the change in capacitance near and at touchdown is independent of disk location or initial fly-height. The example data capacitance signal was captured at 16 KHz, and shows oscillation near touchdown or a jump at about 98 Hz. Integrated circuits are available for capacitance sensor measurements including ACAM and ZMDI chips.

Modifications and variations may be made to the disclosed embodiments while remaining within the spirit and scope of the invention. The implementations described above and other implementations are within the scope of the following claims.

We claim:

1. A proximity sensor to determine a distance of a magnetic head with respect to a surface of a magnetic storage medium, the proximity sensor comprising:
    a capacitor formed by a first conductive element and a second conductive element;
    a capacitance formed by the capacitor when there is a voltage difference between the first conductive element and the second conductive element; and
    a fringing electric field formed beside and by the capacitor when there is the voltage difference between the first conductive element and the second conductive element;
    wherein the first conductive element and the second conductive element are situated: i.) adjacent to a facing surface of the magnetic storage medium, ii.) across an air bearing surface from the magnetic storage medium surface, and iii.) such that the fringing electrical field changes with a positioning change of the magnetic storage medium with respect to at least one of the first conductive element and the second conductive element, and the capacitance changes with the fringing electric field change.

2. The proximity sensor as in claim 1, further comprising a structure that utilizes the capacitance to determine the distance of the magnetic head with respect to the magnetic storage medium surface.

3. The proximity sensor as in claim 1, wherein the first conductive element and the second conductive element are situated at an air bearing surface.

4. The proximity sensor as in claim 1, wherein the first conductive element is situated at the head, wherein the second conductive element is situated at a slider, wherein the slider is electrically isolated from the head, and wherein the slider is connected to an actuator by way of a suspension.

5. The proximity sensor as in claim 1, wherein the first conductive element is at least a portion of a reader shield or a writer shield of the head.

6. The proximity sensor as in claim 1, wherein the first conductive element and the second conductive element are situated at the head, wherein the head is connected to, and electrically isolated from, a slider, and wherein the slider is connected to an actuator by way of a suspension.

7. The proximity sensor as in claim 1, further comprising a third conductive element situated on a reader of the head, wherein:
    i.) the first conductive element is situated on a writer of the head;
    ii.) the third conductive element forms a second capacitor with the second conductive element,
    iii.) a second fringing electric field is formed beside and by the second capacitor;
    iv.) the second conductive element and the third conductive element are situated such that the second fringing electrical field changes with a positioning change of the magnetic storage medium with respect to at least one of the second conductive element and the third conductive element;
    v.) a capacitance of the second capacitor changes with the change in the second fringing electric field; and
    vi.) the capacitance of the second capacitor is utilized to determine the distance of the head to the magnetic storage medium surface.

8. The proximity sensor as in claim 1, wherein the second conductive element has a larger charge magnitude than the first conductive element, and wherein the second conductive element is situated a greater distance from a touchdown location of the head than the first conductive element.

9. The proximity sensor as in claim 1, wherein the first conductive element has a width in the range of 5 microns to 10 microns, and a length in the range of 3 microns to 10 microns.

10. The proximity sensor as in claim 1, wherein the first conductive element is situated below a surface of the head a distance in the range of 1 micron to 50 microns when the first conductive element is fabricated along with wafer fabrication of the head, or in the range of 1 micron to 100 microns when the first conductive element is fabricated along with fabrication of an air bearing surface.

11. The proximity sensor as in claim 1, further comprising a reference conductive element, wherein the reference conductive element is situated at the head such that a positioning change of the magnetic storage medium with respect to the reference conductive element has a minimized or no effect on a capacitance between the reference conductive element and the second conductive element.

12. The proximity sensor as in claim 1, further comprising a dynamic fly height (DFH) controller to detect the capacitance, and to utilize the capacitance information to, at least one of, maintain a constant proximity of the head with respect to the magnetic storage medium, detect contact or touchdown of the head with the magnetic storage medium, and detect a shock event of the head and the magnetic storage medium.

13. A method of determining a distance of a magnetic head with respect to a surface of a magnetic storage medium, the method comprising:
    forming a capacitor utilizing a first conductive element and a second conductive element, wherein the first conductive element and the second conductive element are situated: i.) adjacent to a facing surface of the magnetic storage medium, and ii.) across an air bearing surface from the magnetic storage medium surface;
    forming a fringing electric field beside and by the capacitor, wherein the first conductive element and the second conductive element are situated such that the fringing electrical field changes with a positioning change of the magnetic storage medium with respect to the first conductive element and the second conductive element, and wherein a capacitance of the capacitor changes with the fringing electric field change; and sensing the capacitance to determine the distance of the magnetic bead with respect to the magnetic storage medium surface.

14. The method as in claim 13, further comprising situating the first conductive element at the head, and situating the second conductive element at a slider, wherein the slider is electrically isolated from the head, and wherein the slider is connected to an actuator by way of a suspension.

15. The method as in claim 13, further comprising situating the first conductive element and the second conductive element at the head, wherein the head is connected to, and electrically isolated from, a slider, and wherein the slider is connected to an actuator by way of a suspension.

16. The method as in claim 13, further comprising situating a third conductive element on a reader of the head, and situating the first conductive element on a writer of the head, wherein:
  i.) the third conductive element forms a second capacitor with the second conductive element,
  ii.) a second fringing electric field is formed beside and by the second capacitor;
  iii.) the second conductive element and the third conductive element are situated such that the second fringing electrical field changes with a positioning change of the magnetic storage medium with respect to at least one of the second conductive element and the third conductive element;
  iv.) a capacitance of the second capacitor changes with the change in the second fringing electric field; and
  v.) the capacitance of the second capacitor is utilized to determine the distance of the head to the magnetic storage medium surface.

17. The method as in claim 13, further comprising situating a reference conductive element at the head, such that a positioning change of the magnetic storage medium with respect to the reference conductive element has a minimized or no effect on a capacitance between the reference conductive element and the second conductive element.

18. The method as in claim 13, further comprising detecting the capacitance with a dynamic fly height (DFH) controller, and utilizing the capacitance information to, at least one of, maintain a constant proximity of the head with respect to the magnetic storage medium, detect contact or touchdown of the head with the magnetic storage medium, and detect a shock event of the bead and the magnetic storage medium.

19. A proximity sensor comprising:
  a capacitor formed by a first conductive element and a second conductive element wherein: i.) the first conductive element is situated at a magnetic head, a slider that connects to the magnetic head, a reader of the magnetic head, a writer of the magnetic head, a reader shield of the magnetic head, or a writer shield of the magnetic head, and ii.) the second conductive element is situated at the magnetic head, the slider that connects to the magnetic head, the reader of the magnetic head, the writer of the magnetic head, the reader shield of the magnetic head, or the writer shield of the magnetic head, wherein:
  i.) a capacitance and a fringing electric field are formed by the capacitor when there is a voltage difference between the first conductive element and the second conductive element; and
  ii.) the capacitor is situated such that: a.) the fringing electric field, changes with a positioning change of a magnetic storage medium with respect to at least one of the first conductive element and the second conductive element, and b.) the capacitance changes with the fringing electric field change.

20. The proximity sensor as in claim 19, further comprising the magnetic storage medium facing a surface of the magnetic head and the slider.

21. The proximity sensor as in claim 19, further comprising:
  a first lead connected to the first conductive element;
  a second lead connected to the second conductive element; and
  a source to create the voltage difference between the first conductive element and the second conductive element, wherein the source is connected to the first conductive element via the first lead, and to the second conductive element via the second lead.

22. The proximity sensor as in claim 19, further comprising a structure that utilizes the capacitance information to determine a distance of the magnetic storage medium with respect to at least one of the first conductive element and the second conductive element.

23. The proximity sensor as in claim 19, further comprising a dynamic fly height (DFH) controller to detect the capacitance, and to utilize the capacitance information to, at least one of, maintain a constant proximity of the head with respect to the magnetic storage medium, detect contact or touchdown of the head with the magnetic storage medium, and detect a shock event of the head and the magnetic storage medium.

* * * * *